United States Patent
Rahman et al.

(10) Patent No.: US 6,646,407 B2
(45) Date of Patent: Nov. 11, 2003

(54) ELECTRIC MOTOR CONTROL HAVING DC-DC CONVERTER AND METHOD OF USING SAME

(75) Inventors: Khwaja M. Rahman, Torrance, CA (US); Steven E. Schulz, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 26 days.

(21) Appl. No.: 09/877,634

(22) Filed: Jun. 8, 2001

(65) Prior Publication Data

US 2002/0185989 A1 Dec. 12, 2002

(51) Int. Cl.$^7$ .................................................. H02P 7/05
(52) U.S. Cl. ........................ 318/701; 318/254; 318/162
(58) Field of Search ................................ 318/254, 701, 318/722, 162; 363/15, 16, 20–28, 35, 37, 38

(56) References Cited

U.S. PATENT DOCUMENTS

| | | | | |
|---|---|---|---|---|
| 4,563,619 A | * | 1/1986 | Davis et al. | 318/138 |
| 4,864,483 A | * | 9/1989 | Divan | 363/37 |
| 5,047,913 A | * | 9/1991 | De Doncker et al. | 363/95 |
| 5,172,309 A | * | 12/1992 | De Doncker et al. | 363/132 |
| 5,870,292 A | * | 2/1999 | Lipo et al. | 363/37 |

OTHER PUBLICATIONS

Publication entitled, "New Soft–Switched/Switched–Reluctance Motor Drive Circuit," (Authors, Yoshihiro Murai, Ji Cheng, Masaharu Yoshida; IEEE Transactions on Industry Applications, vol. 35, No. 1, Dated Jan.–Feb. 1999, pp. 78–85).

Publication entitled, "Analysis and application of a part resonant circuit for switched reluctance motor," (Authors, Ji Cheng, Masaharu Yoshida, Yoshihiro Murai, Dated ©1999 IEEE, pp. 1115–1120).

Publication entitled, "A Capacitor–Boosted, Soft–Switched Switched–Reluctance Motor Drive," (Authors, Yoshihiro Murai, Ji Cheng, S. Sugimoto, M. Yoshida, Dated ©1999 IEEE, pp. 424–429).

Publication entitled, "A Simple Soft–Switched Switched–Reluctance Motor Drive," (Authors, Yoshihiro Murai and Ji Cheng, Dated 1998 IEEE, pp. 911–916).

Publication entitled, "New Soft–Switched Reluctance Motor Drive Circuit," (Authors, Yoshihiro Murai, J. Cheng, and M. Yoshida, IEEE Industry Applications Society, New Orleans, Louisiana, Dated Oct. 5–9, 1997, pp. 676–681).

Publication entitled, "A Soft–Switched Reluctance Motor Drive Circuit with Improved Performances," (Authors, Yoshihiro Murai, J. Cheng, M. Yoshida, Dated ©1997 IEEE, pp. 881–886).

Publication entitled, "A Novel Converter Topology For Switched Reluctance Motor Drives," (Author, R. Krishnan, Dated ©1999 IEEE, pp. 1811–1816).

* cited by examiner

*Primary Examiner*—Bentsu Ro
(74) *Attorney, Agent, or Firm*—Christopher DeVries

(57) ABSTRACT

A controller for use in a switched reluctance (SR) motor drive is provided. The controller includes a DC—DC converter coupled to an inverter. The DC—DC converter can be a buck converter, a boost converter, or a buck-boost converter. The control parameters to the DC—DC converter can be optimal. In addition, the bus voltage of the motor drive can be reduced to a level such that the motor operates in single pulse mode. A capacitor can be connected in parallel across the outputs of the DC—DC converter supplying the inverter. Using the DC—DC converter to indirectly profile the phase current can reduce motor torque ripple.

16 Claims, 6 Drawing Sheets

ELECTRIC MOTOR CONTROL HAVING DC-DC CONVERTER AND METHOD OF USING SAME

FIELD OF THE INVENTION

The present invention relates to efficiency optimization and noise reduction and torque ripple reduction techniques for electric motors, and, more particularly, to an improved switched reluctance (SR) motor drive.

BACKGROUND OF THE INVENTION

Switched Reluctance (SR) motors are gaining much attention due to their low cost construction and fault tolerant operation. However, two problems that have kept SR motors away from some applications is their noisy operation and torque ripple. In vehicle propulsion applications, torque ripple can result in low-speed "cogging", which is an undesirable characteristic, sometimes noticeable to drivers.

Techniques are available to reduce the noise and torque ripple of SR motors. Although these techniques are useful in many circumstances, there is room for improvement.

Two known approaches to SR motor design that reduce noise include: i) increasing the stator back iron thickness, and ii) increasing the air gap length. These design approaches to reduce motor noise tend to reduce motor torque density. As a consequence, the resulting SR motor can be bulky, heavy, and costly.

Known control techniques for reducing noise are generally based on modifying the phase de-excitation (turn-off) process during motor operation. The basic idea of these control techniques is to slow down the phase turn-off process by profiling the turn-off current tail to lower the noise. However, reduction of noise by the profiling of the tail current is obtained at the expense of motor efficiency.

One control technique presented by Pollock et al. employs noise cancellation by starting the phase de-excitation with zero voltage and applying the full negative voltage after one-half period of the stator natural resonance frequency. The acceleration of the stator back iron due to the negative voltage tends to cancel the initial acceleration. Thus, noise is reduced. However, this technique is not applicable for all motors, especially the high speed motors.

FIG. 1 illustrates a block diagram of a prior art SR motor control circuit 41 for a switched reluctance (SR) motor 11. The control circuit 41 includes a current regulator (I-REG) 46, an inverter 38, an interpolation scheme 70, a look-up table 72, current sensors 74, a position decoder 76, and an angular velocity calculator 78. Motor windings in the SR motor 11 are connected in series with inverter legs 40,42,45.

In the motor controller 41, when the speed of SR motor 11 is high, the parameters used to control SR motor 11 are phase turn-on angle, $\theta_{ON}$, and phase turn-off angle, $\theta_{OFF}$. At a low speed of operation of SR motor 11, the control parameters are phase turn-on angle, $\theta_{ON}$, phase turn-off angle, $\theta_{OFF}$ and reference current, $I_{REF}$. Additionally, at low speeds, because the back EMF is lower than the bus voltage, $V_{DC}$, it is necessary, in addition to controlling the phase turn-on and turn-off angles, $\theta_{ON}$ and $\theta_{OFF}$, respectively, to limit the phase current. Current limitation is accomplished by the current regulator (I-REG) 46 regulating the reference current, $I_{REF}$, using known techniques of chopping the current.

The two primary forms of current chopping, "hard chopping" and "soft chopping," are often implemented in SR motor inverters, including those inverters similar to the prior art three-phase SR motor inverter 38, as illustrated in detail in FIG. 2. In hard chopping, both the upper and lower switches supplying a certain phase winding (illustrated in FIG. 2 as switches 48, 50 for the first phase winding 51; switches 52, 54 for the second phase winding 53; and switches 56, 58 for the third phase wind 55) are turned on and off (i.e., chopped), simultaneously. In soft chopping, one switch (e.g., 48, 52, 56) is kept on at all times, while the other switch (e.g., 50, 54, 58) is chopped. As compared with soft chopping, hard chopping provides for a greater level of control of the phase current. However, with the prior art inverter 38, hard chopping has a lower efficiency, primarily due to additional switching power losses, higher ripple current and lower power factor. Soft chopping, although it provides for higher efficiency, less ripple current, and higher power factor cannot be implemented during regenerative braking.

The reference current, $I_{REF}$, at a lower speed of operation of SR motor 11, takes the shape of a square wave. The leading and trailing edges of the square wave define the phase turn-on and turn-off angles, $\theta_{ON}$ and $\theta_{OFF}$, respectively, while the amplitude is the current reference, $I_{REF}$. In response to this reference current, $I_{REF}$, a current regulator, I-REG, turns on with full bus voltage, $V_{DC}$, when the leading edge (i.e., the turn-on angle, $\theta_{ON}$) of the current reference, $I_{REF}$, is encountered. The current reference, $I_{REF}$, is then maintained with the chopping of the phase current, as described above. When the trailing edge of the reference current, $I_{REF}$, is reached, the phase is turned off with a full negative bus voltage, $-V_{DC}$.

At high speed, the back EMF is higher than the bus voltage, $V_{DC}$. No current regulation chopping is used at high speeds, and the control is referred to as a "single-pulse" mode. The control parameters at high speed are, therefore, only the phase turn-on and turn-off angles, $\theta_{ON}$ and $\theta_{OFF}$, respectively. In order to build current against a high back EMF, the phase turn-on, $\theta_{ON}$, is advanced. This allows current to build before the back EMF starts to develop. The high phase inductance, of SR motor 11 holds the current for a sufficiently long time against the high back EMF, so that torque can be produced. When the turn-off angle, $\theta_{OFF}$, is reached, the phase is turned off with the full negative bus voltage, $-V_{DC}$. In this mode, there is no chopping of phase current. Both at high speed and at low speed, there exists a unique set of control parameters that can maximize certain performance indices, such as, for example, efficiency. Noise is produced both in the low speed and in the high-speed operations of SR motor 11 during the phase turn-off stage. The high di/dt (i.e., the rate of change of current) produced by the high bus voltage, $V_{DC}$, during phase turn-off sets up vibration in the stator back iron, thus generating noise.

With respect to torque ripple, current profiling is routinely done in SR motors to reduce the torque ripple, especially at low speed operation. Several techniques have been proposed to reduce torque ripple of SR motors. All of these techniques use a high bandwidth current regulator, either hysteretic or PI type, to profile the SR motor phase current such that torque ripple is reduced. A drawback of current profiling with current regulation is that it often lowers SR motor efficiency.

Accordingly it is desirable to have an improved drive for switched reluctance motors that reduces operational noise and torque ripple without sacrificing motor efficiency.

SUMMARY OF THE INVENTION

It is an advantage of the present invention to provide an improved motor drive (control) for SR motors that reduces noise, reduces torque ripple, and increases motor efficiency. Another advantage of the present invention is that it provides a motor controller that does not require phase current sensors and current regulators, such as those required by conventional SR motor drives.

According to one aspect of the present invention, a motor control includes a DC—DC converter coupled to an inverter. The DC—DC converter can be a buck converter, a boost converter, or a buck-boost converter. A capacitor can be connected in parallel across the outputs of the DC—DC converter supplying the inverter.

This arrangement allows the control of the DC bus voltage of the SR motor inverter. The DC bus voltage is controlled optimally to increase the efficiency of the motor. An SR motor operates more efficiently when the DC bus voltage is sufficiently lowered from the motor rated voltage such that motor phase current is in single pulse mode at all speeds and torque. Due to the reduction of the bus voltage, the current rate of change during phase de-excitation, which is the major cause of noise in SR motor, is sufficiently reduced. Hence, noise of the motor is reduced considerably.

To reduce torque ripple, the control technique profiles the bus voltage using the DC—DC converter to indirectly profile the phase current.

Due to the single pulse operation of the motor in the disclosed technique at all speeds, most of the switching losses are reduced for the inverter. Moreover, due to the much lower switching frequency (same as the stator electrical frequency) of the inverter, it is possible to replace fast insulated gate bipolar transistors (IGBTs) (fast IGBTs are needed to improve the current control bandwidth) with slower IGBTs or other switching devices, which usually have much lower saturation voltage. Thus, inverter conduction losses can also be reduced. Furthermore, lower voltage single pulse operation of the motor exhibits higher power factor than the conventional chopping mode of control. Thus, machine and inverter losses are further reduced.

DETAILED DESCRIPTION OF THE PRESENTLY PREFERRED EMBODIMENTS

Figure 1:
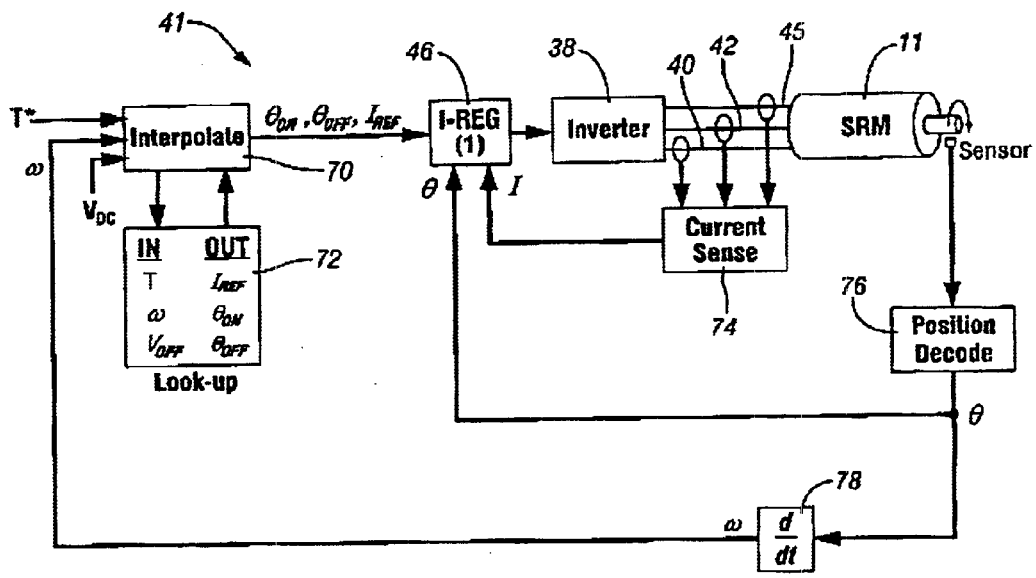
FIG. 1 illustrates a block diagram of a prior art motor controller for a three-phase switched reluctance motor.
Figure 2:
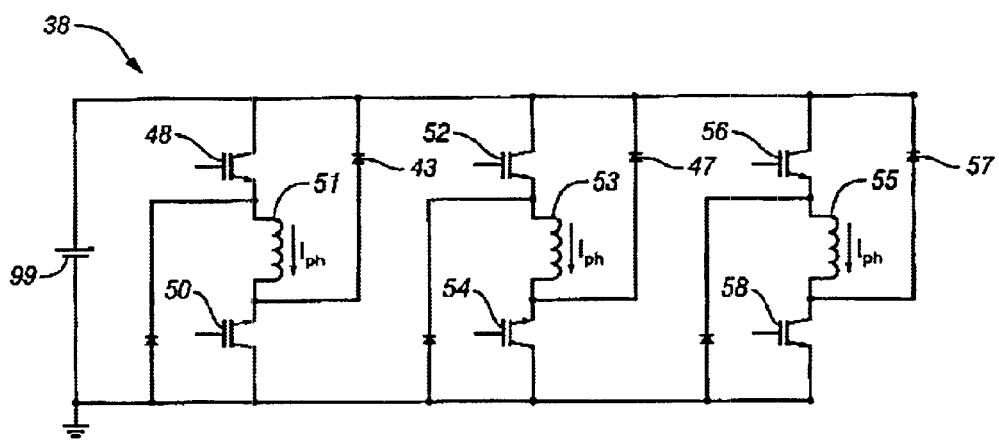
FIG. 2 illustrates a prior art three-phase switched reluctance inverter used by the motor controller of FIG. 1.
Figure 3:
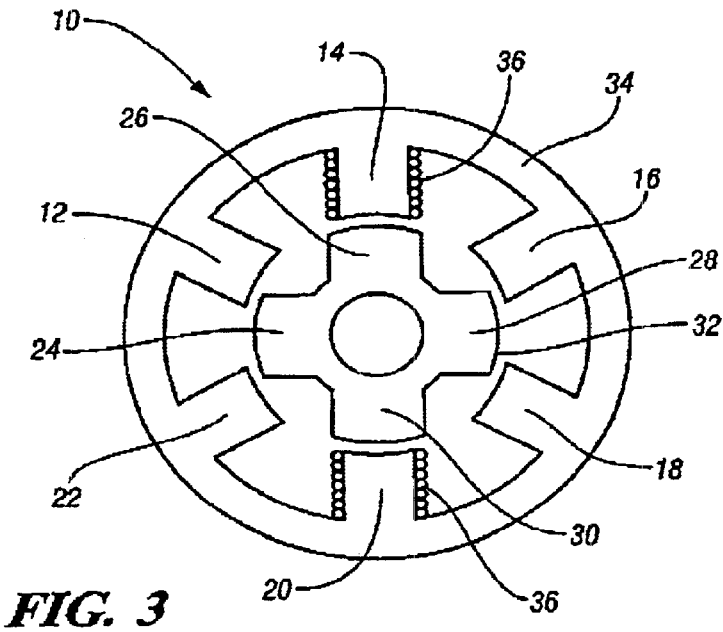
FIG. 3 illustrates a cross-sectional view of a three-phase switched reluctance motor.

FIG. 3 illustrates a cross-sectional view of a conventional three-phase switched reluctance (SR) motor 10. SR motor 10 is shown having six stator poles 12, 14, 16, 18, 20, 22, and four rotor poles 24, 26, 28, 30. However, the present invention may be applicable to various types of SR motors having a varying number of stator poles and a varying number of rotor poles. SR motor 10 includes rotor 32. Rotor 32 is rotatable within stationary stator 34. Stator 34 is provided as shown with three pairs of diametrically opposed salient stator poles, paired as follows: 12/18, 14/20 and 16/22. Each stator pole pair 12/18, 14/20, 16/22 protrudes from stator 34 towards rotor 32. Rotor 32, likewise, is provided as shown with two pairs of diametrically opposed salient rotor poles, paired as follows: 24/28 and 26/30. Each rotor pole pair 24/28, 26/30 protrudes from rotor 32 towards stator 34. The opposing poles of each stator pole pair 12/18, 14/20, 16/22 share a common winding and, additionally, define a respective stator phase. In FIG. 3, as shown, winding 36 is wound about stator pole pair 14/20. Similar windings are provided (though not shown) for each of the other stator pole pairs 12/18, 16/22.

Torque in SR motor 10 is produced in accordance with the tendency of rotor 32 to move to a position where the inductance of the windings represents a maximum value. As such, for the production of motor torque during the operation of SR motor 10, a stator phase may be excited during the time in which the phase inductance is increasing with the position of the rotor. Conversely, for regenerative braking torque, the stator phase is excited during the time in which the phase inductance is decreasing with the position of the rotor. During the motor operation mode, each stator phase is initially excited close to the point where the inductance of the winding is near its minimum value. Additionally, each stator phase is unexcited (or commutated to "off") close to the point where the inductance of the winding is near its maximum value. The opposite is true for the regenerative braking case. The magnetic reluctance to the flux of a certain phase of the SR motor 10 is at its lowest point when a rotor pole pair 24/28 or 26/30 is exactly aligned with the corresponding stator pole pair 12/18, 14/20, or 16/22. Conversely, the magnetic reluctance of the flux of a certain phase of the SR motor 32 is at its highest point when a rotor pole pair 24/28 or 26/30 is at an unaligned position. Thus, for example, during a given phase, if rotor pole pair 24/28 or 26/30 is not aligned with an excited stator pole pair 12/18, 14/20, or 16/22, rotor pole pair 24/28 or 26/30 will tend to move to be in alignment with an excited stator pole pair 12/18, 14/20, or 16/22.

To rotate rotor 32, current is switched on and off in each stator phase winding 36 in a predetermined sequence. The switching process is synchronized with the position of rotor 32. The direction of rotation of rotor 32 is independent of the direction of the current flowing through the phase winding 36 during the excitation phase. Thus, to effectively operate SR motor 10, the magnitude and the duration of the current flowing in the stator phase winding 36 must be controlled.

Figure 4:
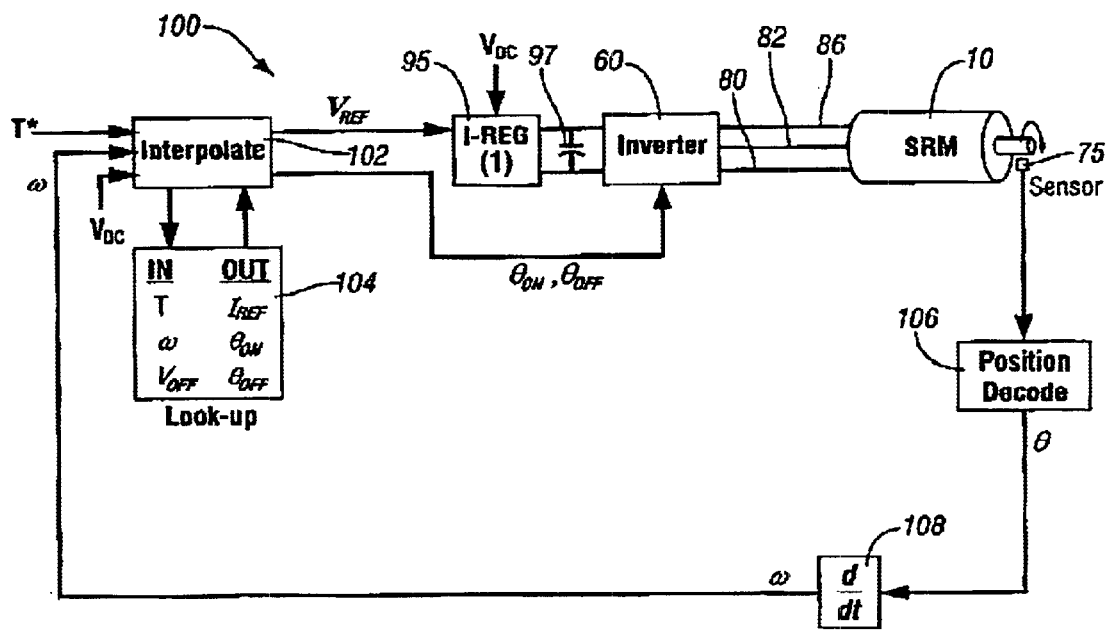
FIG. 4 illustrates a block diagram of a motor controller for a three-phase switched reluctance motor in accordance with the present invention.

FIG. 4 illustrates a block diagram of a motor control 100 for a three-phase switched reluctance motor 10 in accordance with the present invention. The control 100 includes a direct current-to-direct current (DC—DC) converter 95, an inverter 60, an interpolation scheme 102, a parameter look-up table 104, a position sensor 75, a position decoder 106, a predetermined capacitor 97, and an angular velocity calculator 108. Motor windings in the SR motor 11 are connected in series with inverter legs 80, 82, 86. Position self-sensing (sensorless) schemes can be alternatively implemented with the control scheme described herein. This arrangement eliminates the position sensor and the decoder from the motor control 100.

The DC—DC converter 95 can be a buck converter, boost converter, or buck-boost converter. The selection of a particular converter type depends on the input dc voltage and the motor rated voltage. A buck converter can be used if the input dc voltage $V_{dc}$ is higher or equal to the motor rated voltage. A boost converter can be used if the lowest motor control voltage for the motor is higher than the input dc bus voltage $V_{dc}$. A buck-boost converter can be used if a predetermined range of the motor control voltage is lower than the dc input voltage $V_{dc}$ while the remaining range is higher than the input dc voltage. The control scheme of the present invention works with any of the above types of the DC—DC converter.

The DC—DC converter 95 output voltage is controlled optimally to increase efficiency. The motor-inverter efficiency is substantially improved when the motor input voltage is sufficiently lowered as compared to the motor rated voltage so that motor operates in the single pulse mode at all speeds and at all torque levels. There are at least three reasons for the improvement of the motor inverter efficiency in the invented control scheme:

i) The switching losses are reduced from the motor inverter;

ii) Single pulse mode of operation at all speeds improves the motor power factor of operation; and iii) Slower switches with lower saturation voltage can be used.

Figure 6:
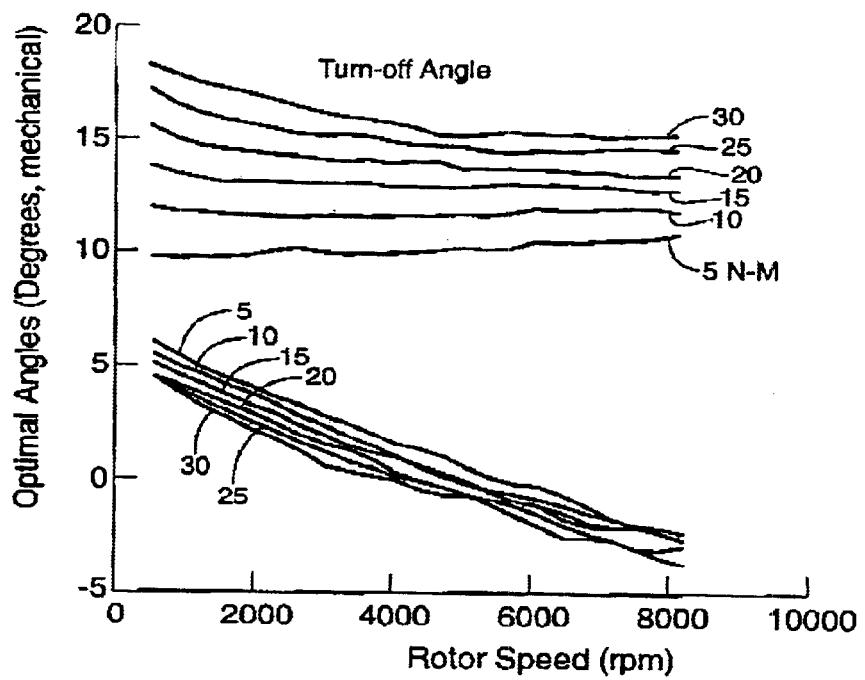
FIG. 6 illustrates a graph of exemplary optimal phase turn-on and turn-off angles for the motor controller of FIG. 4.
Figure 7:
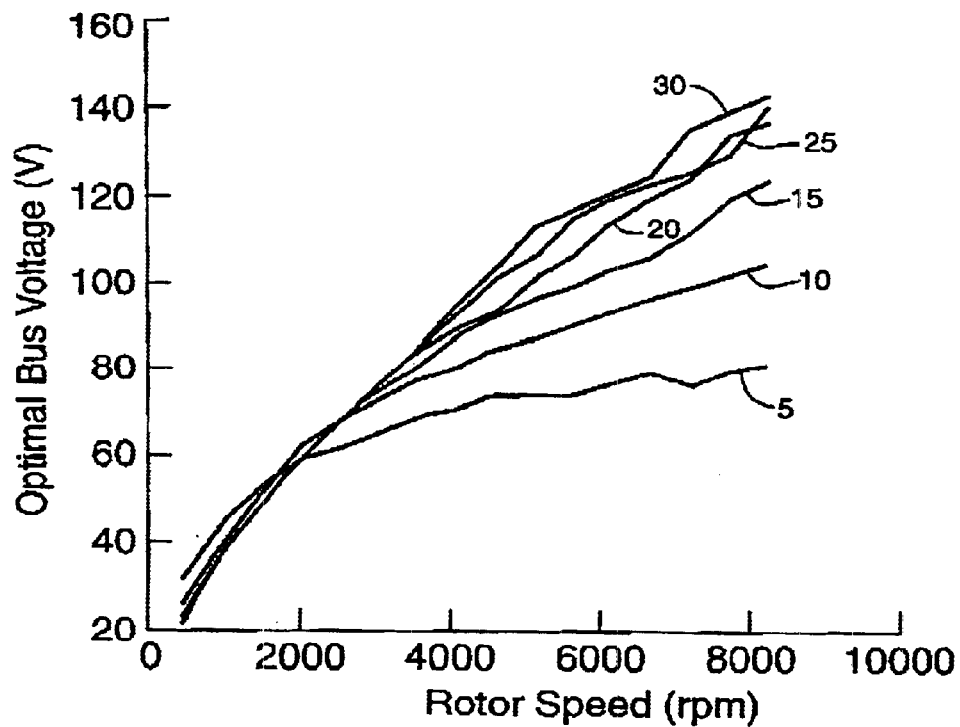
FIG. 7 illustrates a graph of exemplary optimal reference voltages for the motor controller of FIG. 4.

Exemplary optimal control parameters for the control scheme of the present invention at various motor torques and speeds are shown in FIGS. 6–7.

Using the control scheme disclosed herein, there is no need for current regulation. Hence, the disclosed control scheme eliminates the need for current sensors and current regulation from the SR motor inverter. The control parameters are controlled optimally in order to maximize the efficiency of the motor-inverter.

A search algorithm for the control parameters can be computed off-line. The algorithm can rely on a steady state SR motor model to obtain the control parameters. In order to include the effect of the magnetic non-linearity, static flux linkage data obtained either experimentally or through finite element analysis can be used. This efficiency optimized control scheme results in a significant reduction in the machine torque ripple with additional advantage of reduced acoustic noise. The reduction of the machine noise is achieved due to the low voltage single pulse operation of the motor. The lowered dc bus voltage lowers the phase de-excitation di/dt. This results in a reduced noise level in the machine. Torque ripple reduction is achieved by indirectly profiling the phase current by profiling the DC bus voltage.

Figure 5:
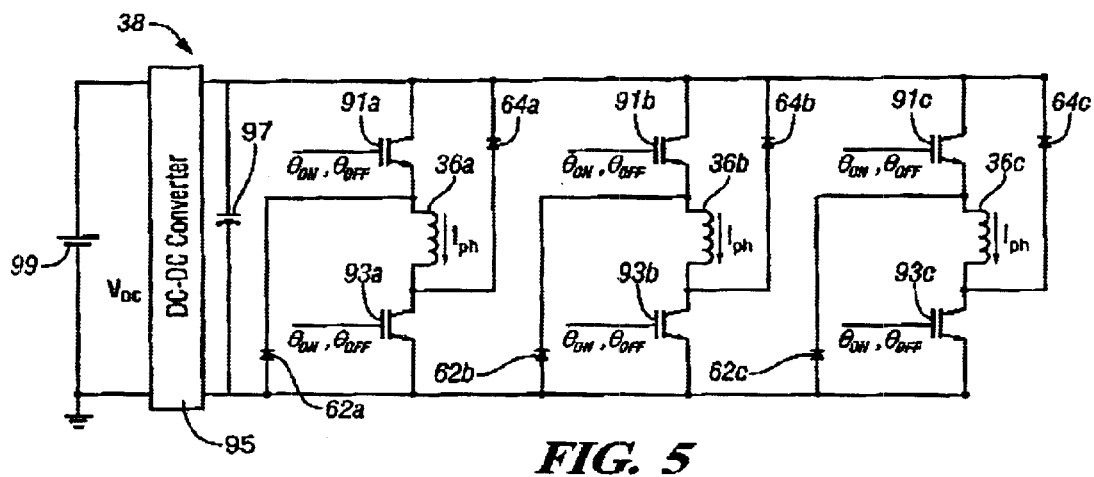
FIG. 5 illustrates a schematic diagram of a three-phase switched reluctance inverter used by the motor controller of FIG. 4, in accordance with the present invention.

FIG. 5 illustrates a schematic diagram of an exemplary three-phase inverter 60 usable by the motor controller 100 of FIG. 4. Both the upper switches 91a–c and the lower switches 93a–c possess the ability to be turned off simultaneously.

The phase windings 36a–c can be excited with both full positive and full negative $V_{DC}$ in one switching cycle. The switches 91a–c, 93a–c can be IGBTs.

The values $\theta_{on}$ and $\theta_{off}$ represent the applied gate control signals to switches 91a–c, 93a–c. Also, the inverter 60 can include freewheeling diodes 62a–c, 64a–c.

Although a specific SR inverter topology is shown in FIG. 5, the control technique of the present invention, however, will work with many different inverter topologies. Since the inverter bus voltage can be varied in the disclosed control scheme, single switch per phase inverters, such as the split phase inverter can be used.

Figure 8:
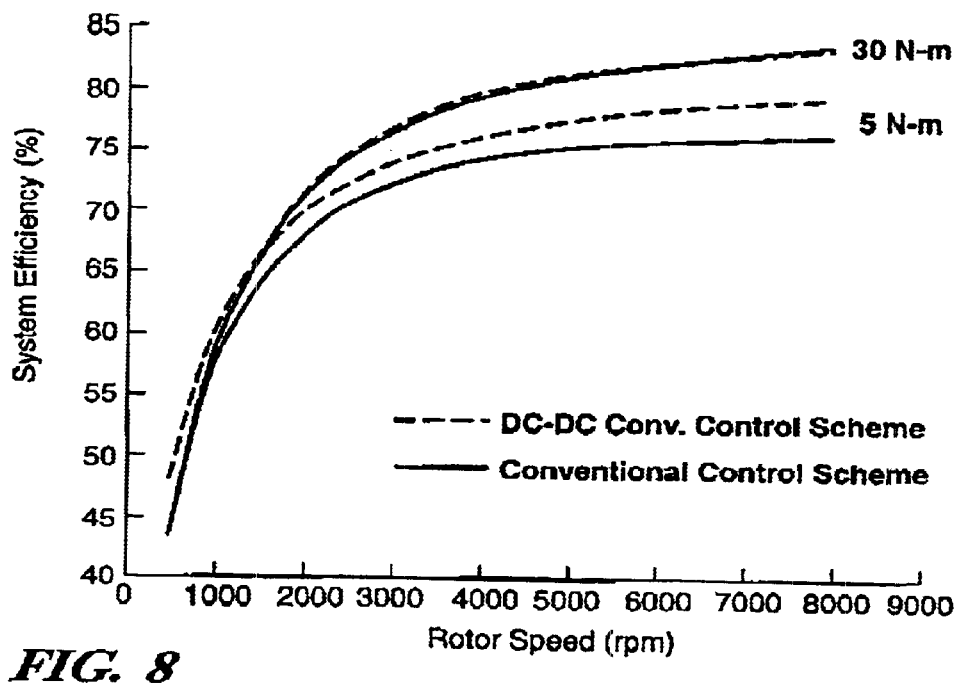
FIG. 8 is a graph illustrating a comparison of the system efficiencies of the motor controller of FIG. 4 and a prior art controller.

FIG. 8 shows the overall system efficiency when controlled optimally (for maximum efficiency) in the conventional mode of control (the solid line curve) and when controlled with a control scheme using a DC—DC converter arrangement of the present invention (the dashed line curve). Significant improvement in efficiency can be obtained. Improvement in the efficiency values can be higher if slower switches, such as slower IGBTs, are used. Slower switches in general have lower saturation voltage drop.

Figure 9:
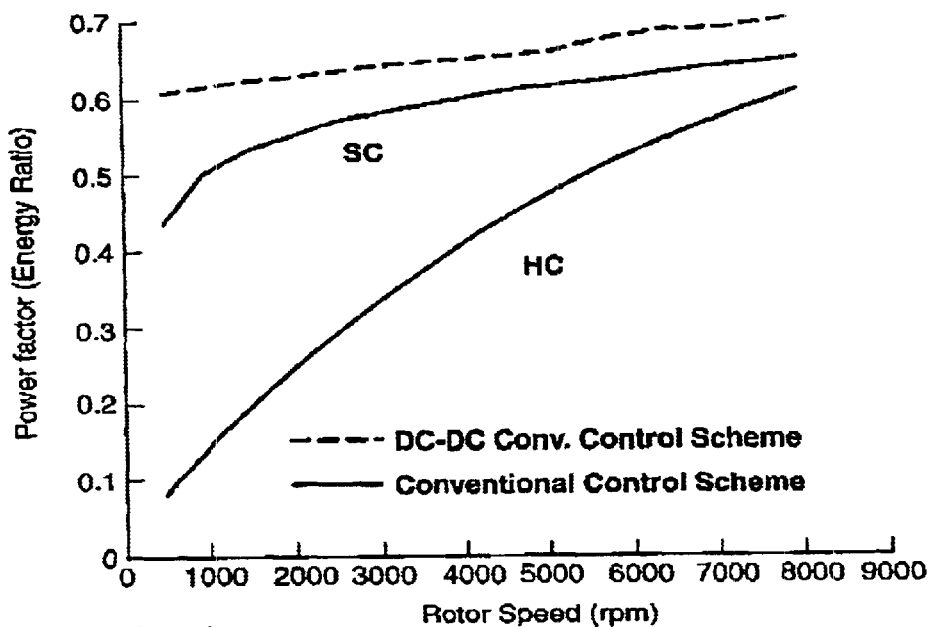
FIG. 9 is a graph illustrating a comparison of power factors for the motor controller of FIG. 4 and a prior art controller.

A comparison of the motor operating power factor for a conventional control for both soft chopping (SC) and hard chopping (HC) and for the disclosed control scheme is shown in FIG. 9. The control scheme improves the machine power factor and thus, reduces machine and inverter losses. Moreover, the inverter volt-ampere rating can also be reduced, thereby lowering cost.

A control scheme in accordance with the present invention reduces the noise level of the motor significantly. This is achieved due to the fact that the turn-off process of the inverter switches is slowed down by lowering the dc bus voltage with the DC—DC converter.

Figure 10:
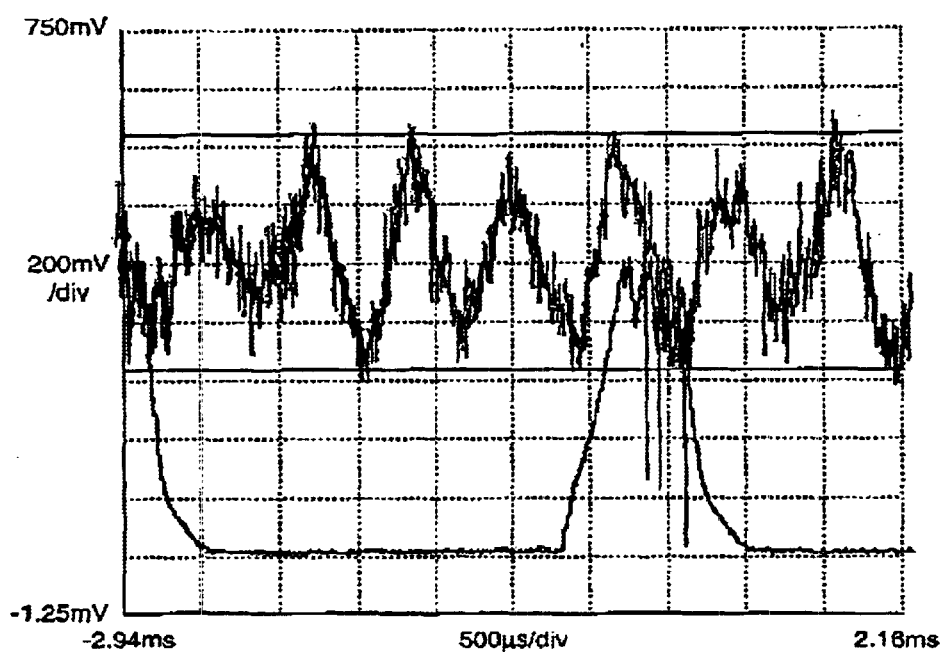
FIG. 10 shows exemplary signal analyzer traces representing stator vibration and corresponding phase current for a prior art mode of control.
Figure 11:
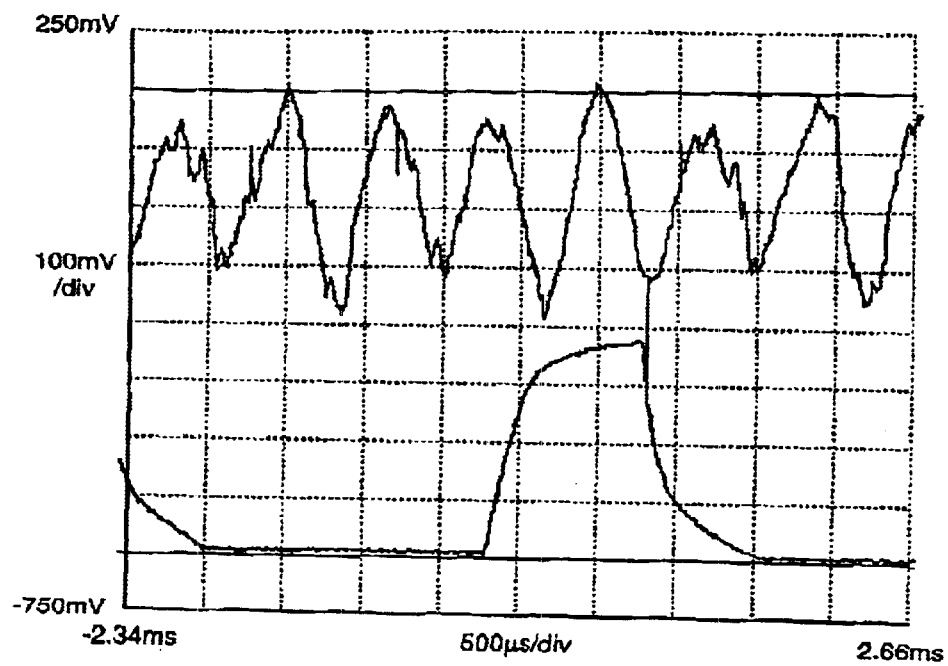
FIG. 11 shows exemplary signal analyzer traces representing stator vibration and corresponding phase current for a mode of control utilizing a DC—DC converter in accordance with the present invention.

The reduction in motor noise level is illustrated in the experimental results shown in FIGS. 10–11. To measure the stator vibration (which is the direct source of SR motor noise) an accelerometer is mounted on top of the stator stack. The accelerometer measures the instantaneous stator stack vibration. FIG. 10 shows the accelerometer vibration (upper trace) and motor phase current (lower trace) for a conventional motor control. The accelerometer reading and the phase current values for a control in accordance with the present invention, having reduced bus voltage, are shown in FIG. 11.

Scale for the accelerometer readings are 200 mv/div for FIG. 10 and 100 mv/div for FIG. 11. The phase current scale is 50 A/div for both FIGS. 10–11. A significant improvement in the motor noise level is achieved in FIG. 11 as compared to the conventional mode of control of FIG. 10. Improvement in motor and inverter efficiency is also achieved.

Figure 12:
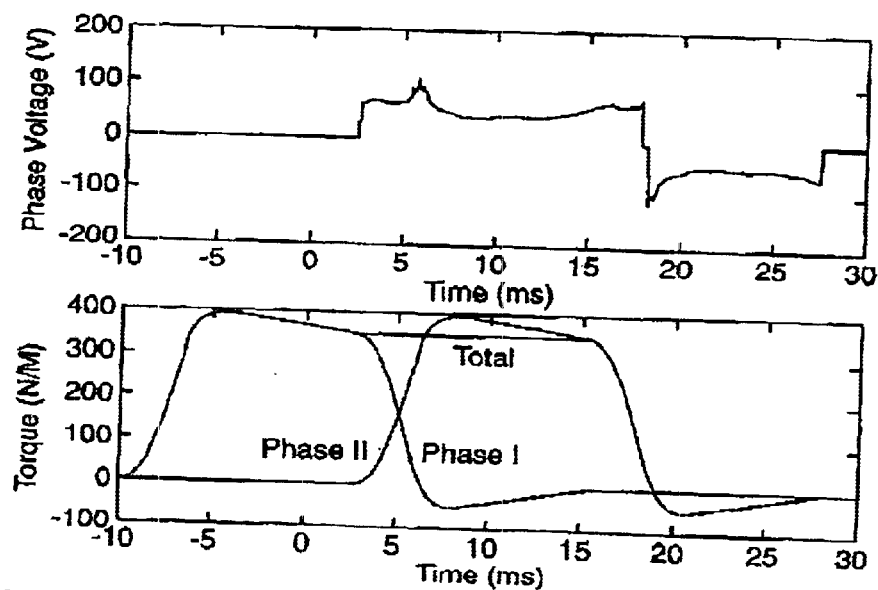
FIG. 12 is a graph illustrating a plot of exemplary phase voltage profiling to indirectly profile the phase current, corresponding phase torque, and resulting total torque with reduced ripple.

FIG. 12 shows the reference voltage for a buck converter for a torque command of 350 N-m and a shaft speed of 100 rpm. The corresponding phase voltage and the machine torque are also shown in FIG. 12.

Phase current is profiled by dynamically varying the DC bus voltage. Torque ripple is reduced at the motor shaft due to the profiling of the current using the front end DC—DC converter 95. The DC bus voltage can be regulated to profile the phase current of the SR motor without any PWM chopping of the SR motor phase current. Since for most applications, including vehicle propulsion, the reduction of torque ripple is performed at low speed, i.e., current profiling is performed at low speed motor operation, the bandwidth requirement of the DC—DC converter can be relatively low.

In accordance with an embodiment of the invention, the control parameter for this scheme is the reference voltage input $V_{REF}$ to the DC—DC converter 95.

It should be appreciated that the embodiments described above are to be considered in all respects only illustrative and not restrictive. The scope of the present invention is indicated by the following claims rather than by the foregoing description. All changes that come within the meaning and range of equivalents are to be embraced within their scope.

We claim:

1. A control system for an electric motor, comprising:
    a position sensor for detecting the rotor position of a switched reluctance (SR) motor;
    a position decoder operatively coupled to the position sensor;
    an angular velocity calculator operatively coupled to the position decoder;
    a DC—DC converter having a plurality of inputs for connecting to a DC power supply and a plurality of outputs;
    a switched reluctance motor inverter operatively coupled to the electric motor having a plurality of inputs connected to the outputs of the DC—DC converter; and
    a means for regulating a DC bus voltage to profile phase current in the electric motor.

2. The control of claim 1, wherein the DC—DC converter is selected from the group consisting of a buck converter, a boost converter, and a buck-boost converter.

3. The control of claim 1, wherein the SR motor inverter includes:
    a first transistor having a first node connected to a first output of the DC—DC converter and a second node for connecting to a phase winding; and
    a second transistor having a first node connected to a second output of the DC—DC converter and a second node for connecting to the phase winding.

4. The control of claim 3, further comprising:
    a freewheeling diode connected to the second node of the first transistor.

5. The control of claim 3, further comprising:
    a freewheeling diode connected to the second node of the second transistor.

6. The control of claim 3, wherein the first and second transistors are insulated gate bipolar transistors.

7. The control of claim 1, further comprising:
    a capacitor connected in parallel across the outputs of the DC—DC converter.

8. The control of claim 1, wherein a bus voltage in the control is reduced to a level such that the electric motor operates in a single pulse mode.

9. The control of claim 1, wherein optimal control parameters to provided to the DC—DC converter to regulate the output voltage thereof.

10. A motor controller, comprising:
    a position sensor for detecting the rotor position of a switched reluctance (SR) motor;
    a position decoder operatively coupled to the position sensor;
    an angular velocity calculator operatively coupled to the position decoder;
    a look-up table for storing a plurality of control parameters;
    an interpolator, operatively coupled to the look-up table and the angular velocity calculator, for outputting a reference voltage and phase indicator;
    a DC—DC converter for receiving the reference voltage and a DC supply voltage; and
    an inverter operatively coupled to one or more phase windings of the SR motor and the outputs of the DC—DC converter.

11. The motor controller of claim 10, further comprising:
    a capacitor connected to the outputs of the DC—DC converter.

12. The motor controller of claim 10, wherein the DC—DC converter is selected from the group consisting of a buck converter, a boost converter, and a buck-boost converter.

13. The motor controller of claim 10, wherein the inverter includes:
    a first transistor having a first node connected to a first output of the DC—DC converter and a second node for connecting to a phase winding of the SR motor; and
    a second transistor having a first node connected to a second output of the DC—DC converter and a second node for connecting to the phase winding of the SR motor.

14. The motor controller of claim 13, further comprising:
    a freewheeling diode connected to the second node of the first transistor.

15. The motor controller of claim 13, further comprising:
    a freewheeling diode connected to the second node of the second transistor.

16. The motor controller of claim 13, wherein the first and second transistors are insulated gate bipolar transistors.

* * * * *